US011592106B2

(12) United States Patent
Thomas

(10) Patent No.: US 11,592,106 B2
(45) Date of Patent: Feb. 28, 2023

(54) HOLLOW ANNULAR SEAL FOR EQUIPMENT DISPOSED IN A SUBSEA ENVIRONMENT

(71) Applicant: Sean P. Thomas, Houston, TX (US)

(72) Inventor: Sean P. Thomas, Houston, TX (US)

( * ) Notice: Subject to any disclaimer, the term of this patent is extended or adjusted under 35 U.S.C. 154(b) by 133 days.

(21) Appl. No.: 16/398,099

(22) Filed: Apr. 29, 2019

(65) Prior Publication Data
US 2019/0331224 A1 Oct. 31, 2019

Related U.S. Application Data

(60) Provisional application No. 62/664,209, filed on Apr. 29, 2018.

(51) Int. Cl.
*F16J 15/10* (2006.01)
*E21B 41/00* (2006.01)
*F16J 15/48* (2006.01)

(52) U.S. Cl.
CPC .......... *F16J 15/104* (2013.01); *E21B 41/0007* (2013.01); *F16J 15/48* (2013.01)

(58) Field of Classification Search
CPC .......... F16J 15/027; F16J 15/104; F16J 15/46; F16J 15/48; E21B 41/0007; E21B 2200/01
USPC ........................................................ 277/605
See application file for complete search history.

(56) References Cited

U.S. PATENT DOCUMENTS

| | | | | |
|---|---|---|---|---|
| 1,859,065 A * | 5/1932 | Anderson | ............. | F16L 17/063 285/107 |
| 2,648,554 A * | 8/1953 | Gilbert, Sr. | .............. | F16J 15/46 277/583 |
| 2,837,360 A * | 6/1958 | Ladd | ........................ | F16J 15/46 277/645 |
| 2,910,209 A * | 10/1959 | Nelson | ................. | A61G 17/036 220/378 |
| 3,313,553 A * | 4/1967 | Gastineau | ............... | F16L 17/08 277/605 |
| 3,573,870 A * | 4/1971 | Gastineau | ............. | F16L 23/003 277/609 |
| 4,155,571 A * | 5/1979 | Gastineau | ............... | F16L 17/08 285/24 |
| 4,624,465 A * | 11/1986 | Rogemont | ............... | F16J 15/46 277/646 |
| 4,699,292 A * | 10/1987 | Farrell | .................... | F16J 15/027 114/201 R |
| 5,114,054 A * | 5/1992 | Watson | .................... | F16J 15/46 222/386 |
| 5,197,807 A * | 3/1993 | Kuznar | ................. | F01D 25/164 277/645 |
| 5,961,128 A * | 10/1999 | Klammer | ................. | F16J 15/46 277/640 |
| 6,146,435 A * | 11/2000 | Stork | .................... | E03F 5/0401 55/385.1 |
| 6,948,715 B2 * | 9/2005 | Taylor | .................... | F16J 15/164 277/331 |
| 10,774,962 B2 * | 9/2020 | Britt, Jr. | .................. | F16L 23/18 |

(Continued)

*Primary Examiner* — Nicholas L Foster
(74) *Attorney, Agent, or Firm* — Polsinelli PC

(57) ABSTRACT

A hollow annular seal for sealing two concentric components in a subsea environment is disclosed. The hollow annular seal is constructed from an elastomeric material with a hollow core. The hollow annular seal also includes a plurality of apertures to allow fluid to flow through the apertures and into the hollow core to prevent collapse of the fluid filled, hollow annular seal.

23 Claims, 5 Drawing Sheets

(56) References Cited

U.S. PATENT DOCUMENTS

2004/0017047 A1* 1/2004 Taylor .................... F16J 15/164
                                                           277/434
2017/0363234 A1* 12/2017 Britt, Jr. .................. F16L 23/18
2020/0408340 A1* 12/2020 Britt ........................ F16L 47/14

* cited by examiner

HOLLOW ANNULAR SEAL FOR EQUIPMENT DISPOSED IN A SUBSEA ENVIRONMENT

CROSS-REFERENCE TO RELATED APPLICATIONS

This application is a U.S. Non-Provisional application which claims priority to U.S. Provisional application No. 62/664,209 filed Apr. 29, 2019, said application is expressly incorporated herein in its entirety.

FIELD

The present disclosure generally relates to seals, and more particularly to a hollow annular seal with a plurality of apertures for equipment disposed in a subsea environment.

BACKGROUND

Flexible seals may be used for a wide range of applications to contain internal pressure, exclude external pressure, or otherwise isolate two environments (e.g., prevent external contaminants from entering a sealed environment). Flexible seals may be defined by a cross sectional shape and a path that the cross section follows, and may commonly include O-rings and other annular seals, and gaskets or weather stripping where the cross section follows a path such as a square or rectangle. Flexible seals are commonly constructed from elastomeric or polymeric materials.

Flexible seals for subsea equipment applications are most commonly used to seal two concentric bodies, where the cross section of the flexible seal follows a circular path thereby defining a ring. For subsea equipment applications, conventional elastomeric O-rings may be used to seal two concentric bodies of a subsea equipment assembly, with the O-ring defining an annular seal with a solid, circular cross section where the cross section follows a continuous circular path. Other types of annular seals used for subsea equipment applications include U-cup seals, lip seals, and modified versions of those types of seals, which have both advantages and disadvantages compared to O-rings.

Unlike conventional applications for annular seals, the subsea environment may present a number of unique requirements, including near-freezing temperatures and very high hydrostatic pressures. The requirements for subsea equipment for the offshore oil industry also present a number of additional challenges unique to this application. Where subsea equipment having annular seals are field-installed (e.g., assembly of subsea connections in the open ocean), the subsea equipment may be exposed to substantial differential pressures or forces, which in some cases may cause the annular seal to be pulled out of its groove due to misalignment with existing subsea equipment, thereby exposing the annular seal to damage or otherwise rendering the seal ineffective.

For example, subsea equipment assemblies may be installed in shallow water depths up to approximately 500 feet with diver support for installation, or alternatively may be installed in deep water conditions up to or exceeding 10,000 feet with support by a remotely operated vehicle (ROV). While the installation vessel will attempt to line up over the true vertical centerline or axis of the subsea equipment interface (e.g., well head, mandrel, hub), it is very common that there will be a substantial error between the alignment of the vessel centerline and the vertical centerline of the subsea equipment interface. Furthermore, any ocean currents present in the open ocean may impose substantial hydrodynamic loads on the subsea equipment assembly during installation, which may further misalign the subsea equipment assembly from the vertical centerline of the subsea equipment interface. Additionally, the subsea equipment interface previously installed directly or indirectly to the seabed will commonly deviate slightly from a true vertical axis, further complicating installation of the subsea equipment assemblies. In these circumstances, a vertical centerline of the subsea equipment assembly (to be installed) may not match the vertical centerline of the existing subsea equipment interface prior to and during installation, thereby complicating installation and increasing the likelihood of damaging the annular seals used on the subsea equipment assemblies.

Furthermore, a great deal of silt and other fine debris may accumulate on the subsea equipment interface over time, a problem that is increased by the directional thrusters of the ROV that will stir up additional silt from the seafloor. During installation of a subsea equipment assembly to an existing subsea equipment interface, the silt stirred up during installation can create a uniformly distributed cloud of silt in the ambient seawater near the seafloor and around the subsea equipment interface. With low visibility, misalignment between the vertical centerlines of the subsea equipment interface and the subsea equipment assembly, and silt accumulating onto the subsea equipment interface and/or the subsea equipment assembly, radial clearances for concentric bodies (e.g., subsea components such as mandrel, pipe, hub, flowlines) used for subsea applications are much larger than would otherwise be required.

Because of the large radial clearances required for coupling subsea equipment assemblies, a conventional approach is to use an oversized annular seal having a substantially large cross-section when compared to conventional annular seals. Use of an oversized annular seal, however, requires a significant compression force (e.g. exceeding 5,000 lbs.) to deflect the seal and may easily exceed the limits of some subsea equipment designs. For example, for a face seal configuration, the compression force required to sealingly engage a subsea equipment component (such as a mandrel of a well head) may require thousands of pounds-force, which may be impractical for some designs. As another example, for a large annular seal used in a piston seal configuration or a rod seal configuration, the compression force required to sealingly engage a subsea equipment component may similarly require thousands of pounds-force. Further, where an oversized annular seal with a large cross-section is installed within a dovetail grove, the amount of force required to compress the annular seal and force the annular seal through the narrow groove opening of the dovetail groove may be very high (e.g. hundreds of pounds or thousands of pounds).

What is needed, therefore, is an annular seal for subsea equipment applications that is capable of sealing large radial clearances between two subsea equipment components regardless of misalignment and debris, requires low compression force to install and adequately seal, is resistant to unintended removal from the seal groove whether wholly or partially, and is resistant to damage during installation and removal.

BRIEF DESCRIPTION OF THE DRAWINGS

The present disclosure is best understood from the following detailed description when read in conjunction with the accompanying Figures.

DETAILED DESCRIPTION

In the following detailed description, numerous specific details are set forth to provide a full understanding of the subject technology. It will be apparent, however, to one of ordinary skill in the art that the subject technology may be practiced without some of these specific details. In other instances, well-known structures and techniques have not been shown in detail so as not to obscure the subject technology.

Figure 1:
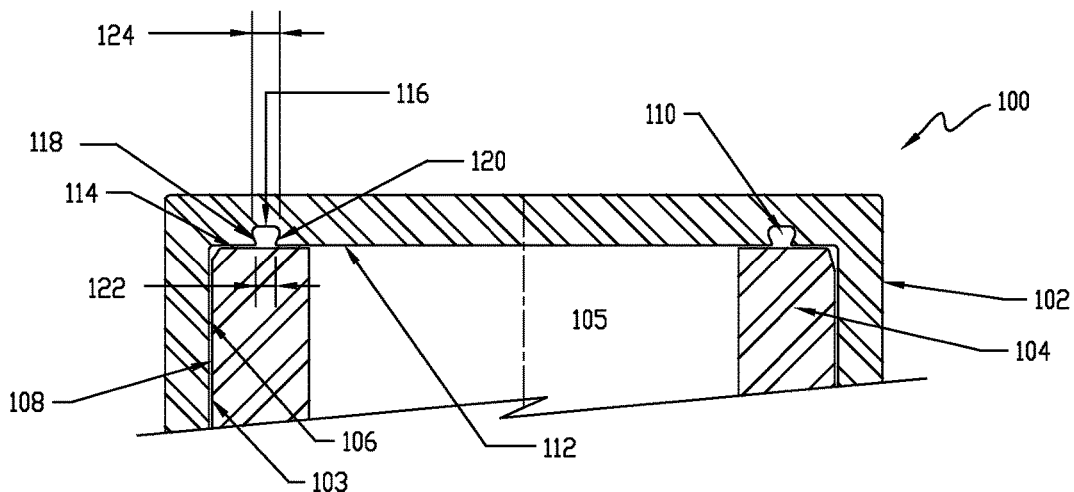
FIG. 1 illustrates a cross sectional view of a subsea equipment assembly disposed in a subsea environment, in accordance with various aspects of the subject technology.

FIG. 1 illustrates a cross sectional view of a subsea equipment assembly 100 disposed in a subsea environment, in accordance with various aspects of the subject technology. The subsea equipment assembly 100 may comprise a first subsea component 102 (e.g., subsea equipment component, housing, flowline, cap, pipe) and a second subsea component 104 (e.g., subsea equipment component, housing, flowline, cap, pipe). The first subsea component 102 may comprise a hollow cylindrical portion having a first diameter and the second subsea component 104 may comprise a hollow cylindrical portion having a second diameter. The first subsea component 102 and second subsea component 104 may be disposed in a concentric arrangement. For example, the first subsea component 102 may be disposed about the second subsea component 104, with an inner cylindrical surface 106 of the first subsea component 102 disposed about an outer circumferential surface 108 of the second subsea component 104. The first subsea component 102 further comprises a groove 110 disposed on a bottom face 112 of the first subsea component 102 to accept an annular seal (not shown) to sealingly engage an upper face 114 of the second subsea component 104 in a configuration known as a face seal, whereby the seal engages the upper face 114 in an axial direction.

In one aspect, the groove 110 may comprise a base 116, a first flank 118 and a second flank 120. The groove 110 shown in FIG. 1 includes a dovetail having tapered or angled flanks 118, 120 defining a groove opening 122 that is narrower than the maximum groove width 124. The groove opening 122 may be sized to be narrower than a width of an annular seal (not shown) to be installed within the groove 110 such that the annular seal, when installed, will be mechanically trapped within the groove 110. The first subsea component 102 and the second subsea component 104 further define an annular gap 103 between the two concentric components 102, 104 radially outward of the groove 110. An interior bore 105 is defined by the second subsea component 104.

Figure 2:
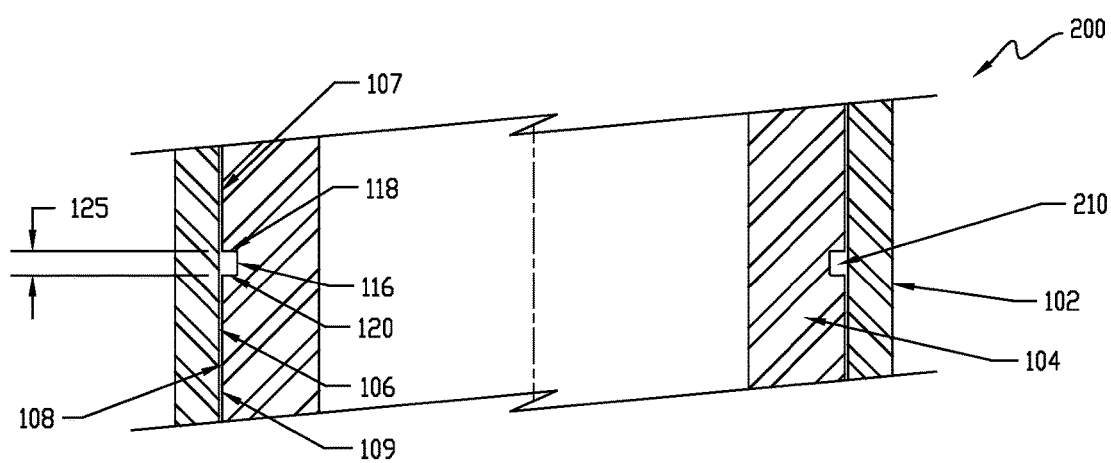
FIG. 2 illustrates a cross sectional view of a subsea equipment assembly disposed in a subsea environment, in accordance with various aspects of the subject technology.

FIG. 2 illustrates a cross sectional view of a subsea equipment assembly 200 disposed in a subsea environment, in accordance with various aspects of the subject technology. The subsea equipment assembly 200 comprises an outward facing groove 210 disposed on the outer circumferential surface 108 of the second subsea component 104 configured to accept an annular seal (not shown) to sealingly engage the inner cylindrical surface 106 of the first subsea component 102 in a configuration known as a piston seal, whereby the seal engages the inner cylindrical surface 106 in a radial direction.

In one aspect, the groove 210 may comprise a base 116 and parallel flanks 118, 120 defining a groove width 125 that may be wider than a width of an annular seal (not shown) to be installed within the groove 210. The first subsea component 102 and the second subsea component 104 further define an upper annular gap 107 between the two concentric components 102, 104 and above the groove 210, as well as a lower annular gap 109 below the groove 210 and between the two components 102, 104.

Figure 3:
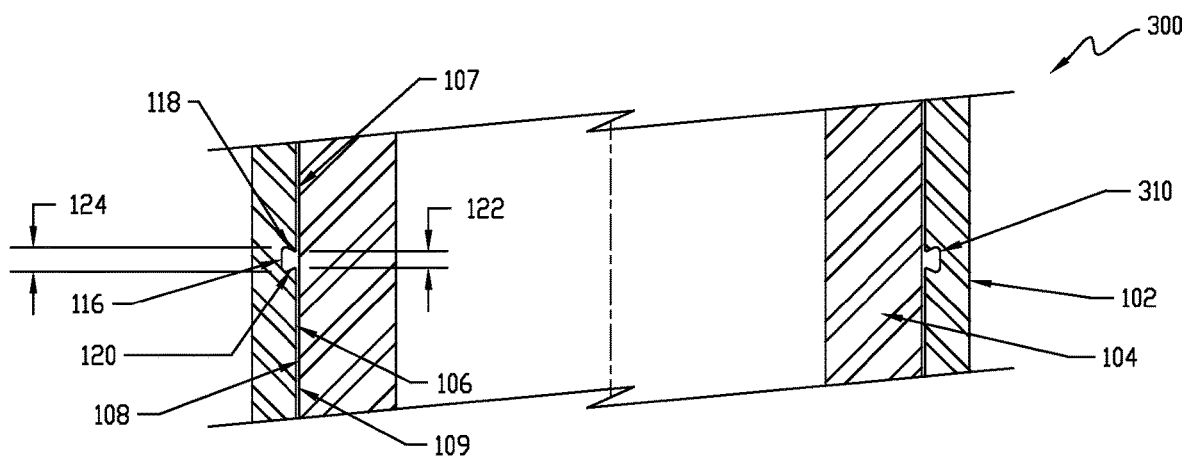
FIG. 3 illustrates a cross sectional view of a subsea equipment assembly disposed in a subsea environment, in accordance with various aspects of the subject technology.

FIG. 3 illustrates a cross sectional view of a subsea equipment assembly 300 disposed in a subsea environment, in accordance with various aspects of the subject technology. The subsea equipment assembly 300 comprises an inward facing groove 310 disposed on the inner cylindrical surface 106 of the first subsea component 102 configured to accept an annular seal (not shown) to sealingly engage the outer circumferential surface 108 of the second subsea component 104 in a configuration known as a rod seal, whereby the seal engages the outer circumferential surface 108 in a radial direction.

In one aspect, the groove 310 may comprise a dovetail having a base 116 and tapered or angled flanks 118, 120 defining a groove opening 122 that is narrower than the maximum groove width 124. The groove opening 122 may be sized to be narrower than a width of an annular seal (not shown) to be installed within the groove 310 such that the annular seal may be mechanically trapped within the groove 310. The first subsea component 102 and the second subsea component 104 further define an upper annular gap 107 between the two concentric components 102, 104 and above the groove 310, as well as a lower annular gap 109 below the seal groove 310 and between the two concentric components 102, 104.

In another aspect, a dovetail groove may comprise a single dovetail having a base, a first flank that is perpendicular to the base, with a tapered or angled second flank defining a groove opening that is narrower that a maximum groove width, and further narrower than a width of an annular seal to be installed within the single dovetail groove, such that the single dovetail groove may mechanically capture the annular seal when installed within the single dovetail groove. In another aspect, a dovetail groove may comprise a modified dovetail groove having a base, a first flank having a curved shape such as a partial circular or partial elliptical shape, and a second flank having a curved shape such as a partial circular or partial elliptical shape. The first flank and the second flank may define an opening that is narrower than a maximum groove width, and further narrower than a width of an annular seal to be installed within the modified dovetail groove, such that the modified dovetail groove may mechanically capture the annular seal when installed within the modified dovetail groove.

Figure 4:
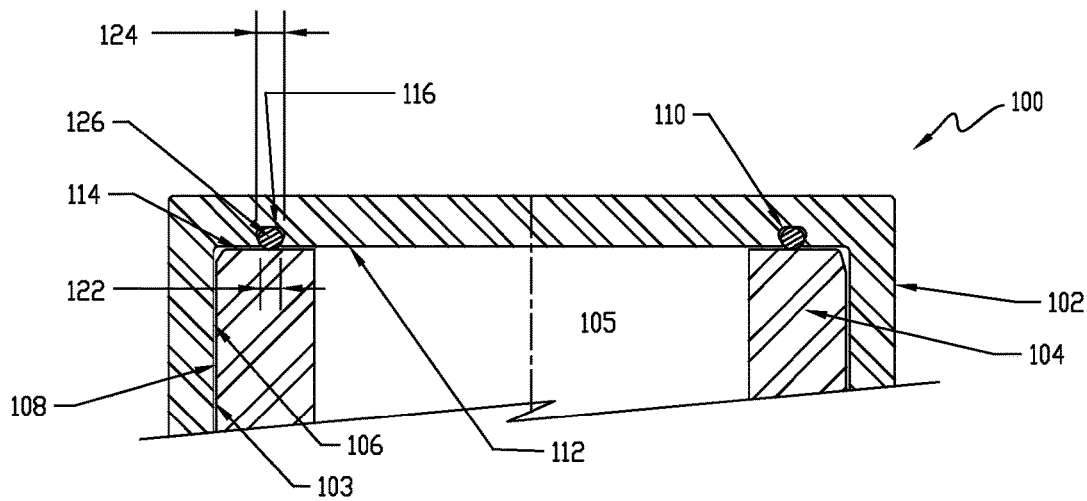
FIG. 4 illustrates a cross sectional view of a subsea equipment assembly with an annular seal disposed within a dovetail groove, in accordance with various aspects of the subject technology.

FIG. 4 illustrates a cross sectional view of the subsea equipment assembly 100 with an annular seal 126 disposed within a dovetail groove 110, in accordance with various aspects of the subject technology. The groove 110 is disposed on the bottom face 112 of the first subsea component 102 in a face seal configuration to sealingly engage the upper face 114 of the second subsea component 104. The groove 110 comprises a dovetail having an opening 122 that is narrower than a maximum width of the seal 126. Because the seal 126 has a width that is larger than the opening 122, the seal 126 is positively retained within the groove 110 such that the seal 126 cannot be easily or unintentionally removed. The seal 126 installed within the groove 110 of the first subsea component 102 sealingly engages the upper face 114 of the second subsea component 104, to thereby contain pressure within the interior bore 105 of the second subsea component 104 and isolate the interior bore 105 from the external subsea environment.

Figure 5:
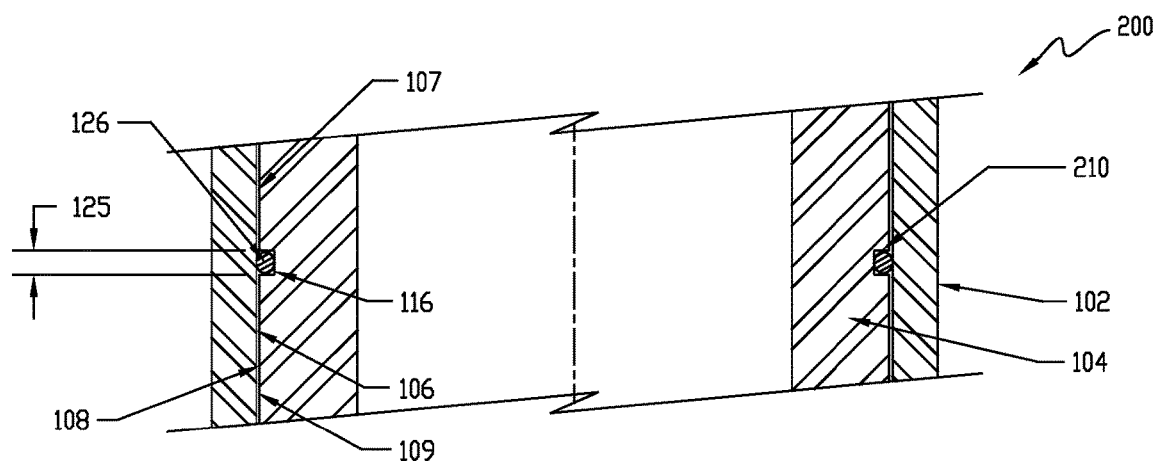
FIG. 5 illustrates a cross sectional view of a subsea equipment assembly with an annular seal disposed within a groove, in accordance with various aspects of the subject technology.

FIG. 5 illustrates a cross sectional view of the subsea equipment assembly 200 with an annular seal 126 disposed within a groove 210, in accordance with various aspects of the subject technology. The groove 210 is disposed in the outer circumferential surface 108 of the second subsea component 104 in a piston seal configuration to sealingly engage the inner cylindrical surface 106 of the first subsea component 102. The groove 210 has a groove width 125 with parallel flanks 118, 120 that are each perpendicular to the base 116, with the groove width 125 being wider than a width of the seal 126. To install the seal 126 within the groove 210, the seal 126 must be stretched and slid over outer circumferential surface 108 and into the groove 210. In this manner, the seal 126 may be secured within the groove 210. The seal 126 installed within the groove 210 of the second subsea component 104 sealingly engages the inner cylindrical surface 106 of the first subsea component 102, to thereby contain pressure within the upper annular gap 107 and/or the lower annular gap 109, and isolate the upper annular gap 107 from the lower annular gap 109.

Figure 6:
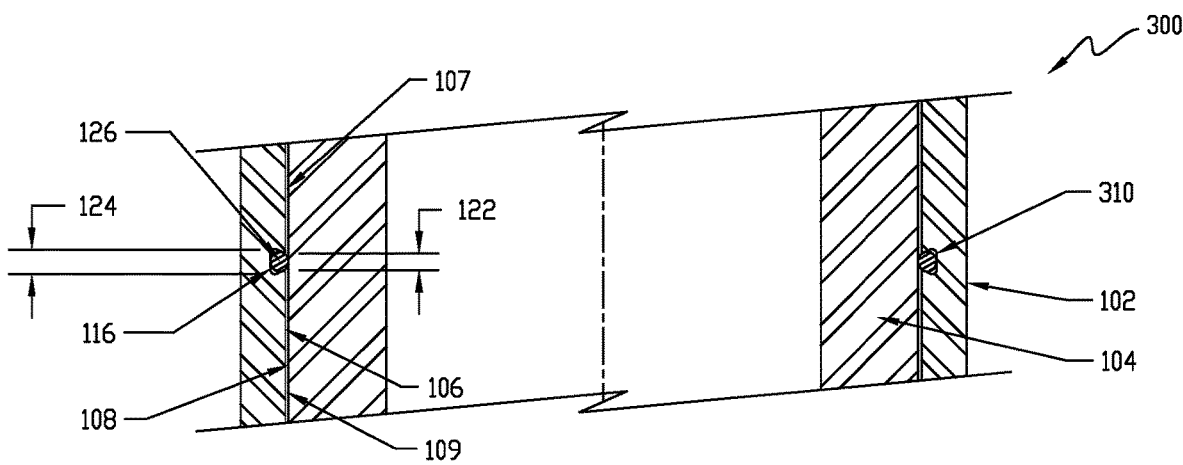
FIG. 6 illustrates a cross sectional view of at subsea equipment assembly with an annular seal disposed within a dovetail groove, in accordance with various aspects of the subject technology.

FIG. 6 illustrates a cross sectional view of the subsea equipment assembly 300 with an annular seal 126 disposed within a dovetail groove 310, in accordance with various aspects of the subject technology. The groove 310 is disposed in the inner cylindrical surface 106 of the first subsea component 102 in a rod seal configuration to sealingly engage the outer circumferential surface 108 of the second subsea component 104. The groove 310 comprises a dovetail having an opening 122 that is narrower than a maximum width of the seal 126. Because the seal 126 has a width that is larger than the opening 122, the seal 126 is positively retained within the groove 310 such that the seal 126 cannot be easily or unintentionally removed. The seal 126 installed within the groove 310 of the first subsea component 102 sealingly engages the outer circumferential surface 108 of the second subsea component 104, to thereby contain pressure within the upper annular gap 107 and/or the lower annular gap 109, and isolate the upper annular gap 107 from the lower annular gap 109.

Figure 7:
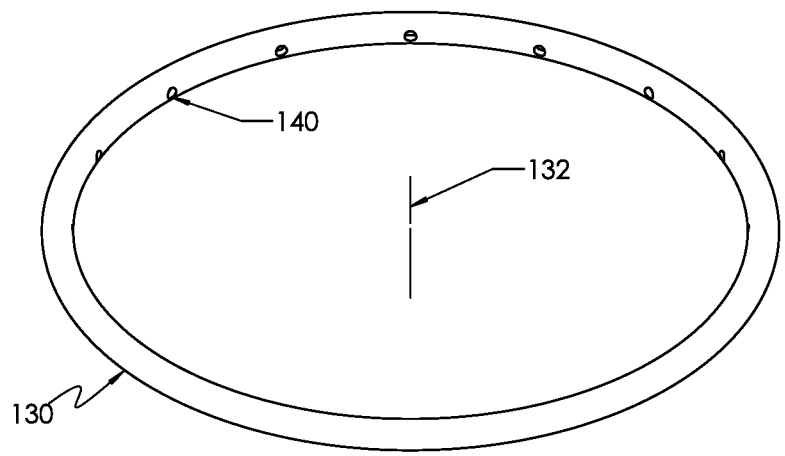
FIG. 7 illustrates an isometric view of an exemplary hollow annular seal, in accordance with various aspects of the subject technology.

FIG. 7 illustrates an isometric view of an exemplary hollow annular seal 130, in accordance with various aspects of the subject technology. The hollow annular seal 130 can comprise an elastomeric material that may, for example, include natural rubbers, synthetic rubbers, polyurethanes and similar elastomeric compounds as would be known by a person of ordinary skill. The hollow annular seal 130 defines a central axis 132 and further comprises a plurality of apertures 140.

Figure 8:
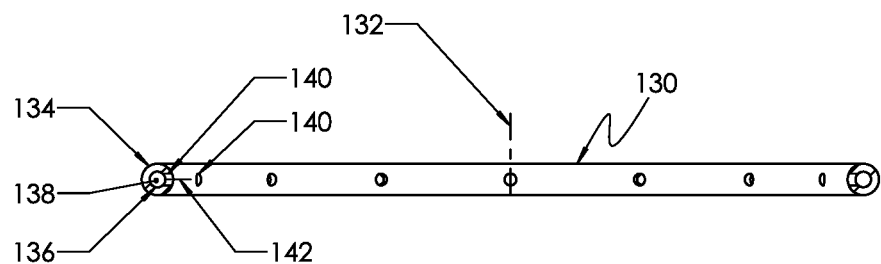
FIG. 8 illustrates a partial cross sectional view of an exemplary hollow annular seal, in accordance with various aspects of the subject technology.

Referring to FIG. 8, a cross sectional view of the hollow annular seal 130 is illustrated, in accordance with various aspects of the subject technology. The hollow annular seal 130 may comprise a first circular shape defining an exterior of the cross section 134, a second circular shape defining an interior of the cross section 136, and a hollow core 138. In one aspect, by utilizing a seal with a hollow core, a compression force necessary for deflecting the hollow annular seal 130 and generating a seal between two concentrically arranged subsea components is greatly reduced. In another aspect, because the cross section of the hollow annular seal 130 comprises a closed profile (e.g., circular profile) and not an open profile (e.g., U-profile), the hollow annular seal 130 is better retained or mechanically trapped within a groove (e.g., groove 110, 210, 310) and the likelihood that the hollow annular seal 130 may be inadvertently removed from the groove is greatly reduced.

Figure 9:
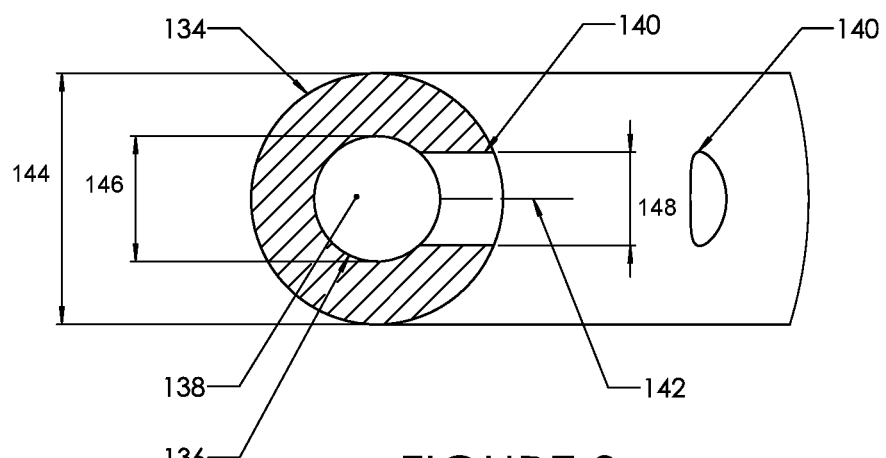
FIG. 9 illustrates an enlarged partial cross sectional view of the exemplary hollow annular seal of FIG. 8, in accordance with various aspects of the subject technology.

Referring to FIG. 9, an enlarged cross sectional view of the hollow annular seal 130 is illustrated, in accordance with various aspects of the subject technology. Each aperture of the plurality of apertures 140 penetrates through the cross section of the hollow annular seal 130 to fluidly couple the hollow core 138 to a fluid source or pressure source external of the hollow annular seal 130, and thereby allow the fluid to enter the hollow core 138 via one or more apertures of the plurality of apertures 140 to prevent collapse of the hollow annular seal 130 when disposed in a subsea environment.

In some aspects, the hollow annular seal 130 may be in fluid communication with an upstream pressure source that causes fluid provided by the upstream pressure source to flow through one or more apertures of the plurality of apertures 140 and within the hollow core 138 of the hollow annular seal 130, to thereby prevent the hollow annular seal 130 from collapsing and further, to maintain an adequate seal between concentrically arranged subsea components.

The hollow annular seal 130 of FIGS. 7-9 may be configured for use as a face seal where the hollow annular seal 130 engages concentrically arranged subsea components in an axial direction, as shown for example in the subsea equipment assembly 100 illustrated in FIG. 1. In some aspects, the plurality of apertures 140 are arranged on the hollow annular seal 130 to prevent contact with sealing surfaces of the concentrically arranged subsea components (e.g., subsea components 102, 104). For example, the plurality of apertures 140 may be arranged away from the sealing surfaces of the concentrically arranged subsea components. In other words, the plurality of apertures 140 may be arranged or oriented to avoid contact with the sealing surfaces of the concentrically arranged subsea components. In one aspect, by avoiding contact with the sealing surfaces of the concentrically arranged subsea components, the sealing performance of the hollow annular seal 130 is not compromised because surfaces of the hollow annular seal 130 that contact the sealing surfaces of the concentrically arranged subsea components are devoid of any apertures and therefore, the sealing function and performance of the hollow annular seal 130 is not compromised or otherwise weakened.

Referring to FIG. 1, for example, the hollow annular seal 130 may be disposed within the groove 110 where a sealing or contact surface (e.g., upper face 114) of the second subsea component 104 sealingly engages the hollow annular seal 130 on first solid surface of the hollow annular seal 130, and a base (e.g., base 116, sealing or contact surface) of the groove 110 of the first subsea component 102 sealingly engages the hollow annular seal 130 on a second solid surface of the hollow annular seal 130. In this example, the plurality of apertures 140 are arranged away from the contact surface of the second subsea component 104 and the base of the groove 110, as the plurality of apertures 140 are arranged radially inward and toward an inside flank 120 of the groove 110, at approximately 90 degrees, or perpendicular to the contact surface of the second subsea component 104. As shown in FIG. 9, a central axis 142 for each aperture of the plurality of apertures 140 may be disposed perpendicular to the central axis 132 (as shown in FIG. 7) and oriented towards the central axis 132.

In operation, as the first subsea component 102 with the hollow annular seal 130 disposed within the groove 110 is introduced into the ocean, the plurality of apertures 140 allow fluid (e.g., seawater) to enter the hollow core 138. After the first subsea component 102 is installed onto the second subsea component 104, the plurality of apertures 140 will be in fluid communication with the interior bore 105 of the second subsea component 104 to allow fluid or pressure from the interior bore 105 to enter the hollow core 138 of the hollow annular seal 130. Specifically, when installed within the groove 110, the plurality of apertures 140 are positioned some distance from the base 116 of the groove 110 and similarly, positioned some distance from the upper face 114 of the second subsea component 104, in order to ensure that the plurality of apertures 140 do not interfere with a sealing function or performance of the hollow annular seal 130, while ensuring that the hollow core 138 of the hollow annular seal 130 is in fluid communication with the interior bore 105 of the second subsea component 104 via the plurality of apertures 140. Pressure from a fluid or pressure source may enter the hollow core 138 of the hollow annular seal 130 via one or more apertures of the plurality of apertures 140 to pressurize and further expand the hollow annular seal 130 against the base 116 of the groove 110 of the first subsea component 102 and the upper face 114 of the second subsea component 104 to thereby improve sealing performance of the hollow annular seal 130.

Referring to FIG. 9, the interior of the cross section 136 of the hollow annular seal 130 is smaller than the exterior of the cross section 134, defining a relatively thick wall section that constitutes a side wall of the annular seal. In one aspect, by providing a thick wall section, the hollow annular seal 130 is resilient and capable of generating a sufficient outward force (or expansion force) for sealing without requiring thousands of pounds-force to compress or deflect upon installation into the receiving groove 110, as would be required with conventional solid annular seals. The circular shape defining the exterior of the cross section 134 of the hollow annular seal 130 may have an outside diameter 144, and the circular shape defining the interior of the cross section 136 may have an inside diameter 146. In one aspect, to provide a sufficient outward or expansion force, a ratio of the outside diameter 144 to the inside diameter 146 may be approximately 2 to 1. In one example, the outside diameter 144 of the hollow annular seal 130 may be larger than a width of the opening 122 of the groove 110 (as shown in FIG. 1). When installed within the groove 110, the hollow annular seal 130 is disposed within the tapered or angled flanks 118, 120 and positively or mechanically engaged within the groove 110 (as shown in FIG. 4). The expansion force of the hollow annular seal 130 provides several beneficial functions for subsea applications, including good sealing performance with large clearance gaps, lower installation force into a dovetail groove as compared to conventional solid annular seals, and resistance to unintentional removal of the hollow annular seal 130 from a groove.

Each aperture of the plurality of apertures 140 may have a diameter 148. In one aspect, the diameter 148 may be large to allow free communication of fluid to the hollow core 138. For example, the diameter 148 may be about one-half or larger of the inside diameter 146 of the interior cross-section 136 or the hollow core 138. In this example, the hollow core 138 of the hollow annular seal 130 may freely communicate with an interior bore of subsea components (e.g., interior bore 105 of second subsea component shown in FIG. 4) via the plurality of apertures 140, to prevent collapse of the hollow annular seal 130 and to contain fluid within the interior bore 105 of the subsea equipment assembly 100 (as shown in FIG. 4).

Figure 10:
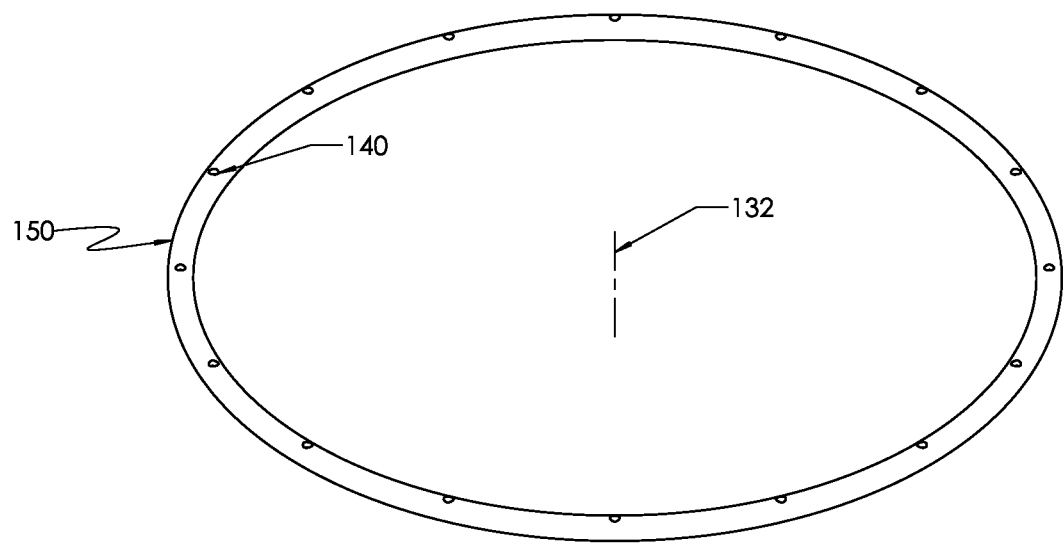
FIG. 10 illustrates an isometric view of an exemplary hollow annular seal, in accordance with various aspects of the subject technology.

FIG. 10 illustrates an isometric view of an exemplary hollow annular seal 150, in accordance with various aspects of the subject technology. The hollow annular seal 150 may be similar in some aspects to the hollow annular seal 130 described above, therefore, like parts will be designated by like reference numerals and will not be further detailed below. The hollow annular seal 150 can comprise an elastomeric material that may, for example, include natural rubbers, synthetic rubbers, polyurethanes and similar elastomeric compounds as would be known by a person of ordinary skill. The hollow annular seal 150 defines a central axis 132 and further comprises a plurality of apertures 140.

Figure 11:
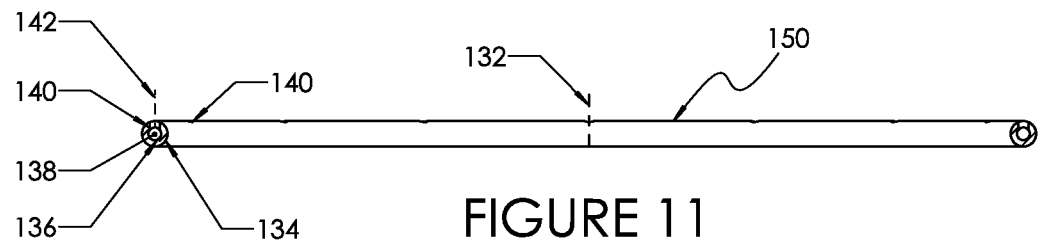
FIG. 11 illustrates a partial cross sectional view of an exemplary hollow annular seal, in accordance with various aspects of the subject technology.

Referring to FIG. 11, a cross sectional view of the hollow annular seal 150 is illustrated, in accordance with various aspects of the subject technology. The hollow annular seal 150 may comprise a first circular shape defining an exterior of the cross section 134, a second circular shape defining an interior of the cross section 136, and a hollow core 138. Each aperture of the plurality of apertures 140 penetrates through the cross section of the hollow annular seal 150 to fluidly couple the hollow core 138 to a fluid source or pressure source external of the hollow annular seal 150, and thereby allow the fluid to enter the hollow core 138 via one or more apertures of the plurality of apertures 140 to prevent collapse of the hollow annular seal 150 when disposed in a subsea environment.

In some aspects, the hollow annular seal 150 may be in fluid communication with an upstream pressure source that causes fluid provided by the upstream pressure source to flow through one or more apertures of the plurality of apertures 140 and within the hollow core 138 of the hollow annular seal 150, to thereby prevent the hollow annular seal 150 from collapsing and further, to maintain an adequate seal between concentrically arranged subsea components.

Figure 12:
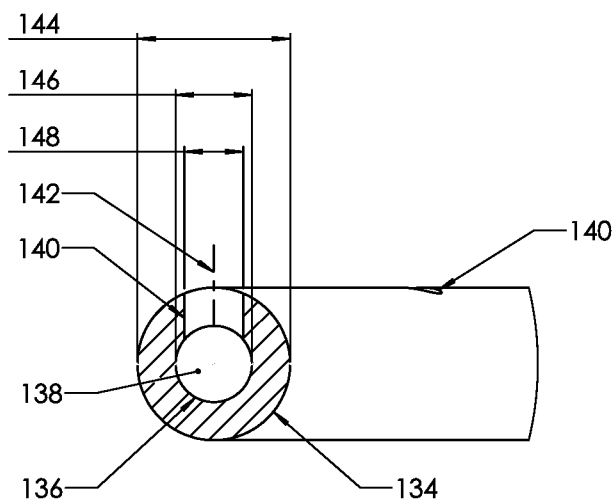
FIG. 12 illustrates an enlarged partial cross sectional view of the exemplary hollow annular seal of FIG. 11, in accordance with various aspects of the subject technology.

The hollow annular seal 150 of FIGS. 10-12 may be configured for use as a piston seal where the hollow annular seal 150 engages concentrically arranged subsea components in a radial direction, as shown for example in the subsea equipment assembly 200 illustrated in FIG. 5. Alternatively, the hollow annular seal 150 may be configured for use as a rod seal where the hollow annular seal 150 engages concentrically arranged subsea components in a radial direction, as shown for example in the subsea equipment assembly 300 illustrated in FIG. 6. In some aspects, the plurality of apertures 140 are arranged on the hollow annular seal 150 to prevent contact with sealing surfaces of the concentrically arranged subsea components (e.g., subsea components 102, 104). For example, the plurality of apertures 140 may be arranged away from the sealing surfaces of the concentrically arranged subsea components. In other words, the plurality of apertures 140 may be arranged or oriented to avoid contact with the sealing surfaces of the concentrically arranged subsea components. By avoiding contact with the sealing surfaces of the concentrically arranged subsea components, the sealing performance of the hollow annular seal 150 is not compromised because surfaces of the hollow annular seal 150 that contact the sealing surfaces of the concentrically arranged subsea components are devoid of any apertures and therefore, the sealing function and performance of the hollow annular seal 150 is not compromised or otherwise weakened.

Referring to FIG. 2, for example, the hollow annular seal 150 may be disposed within the groove 210 where a sealing or contact surface (e.g., inner cylindrical surface 106) of the first subsea component 102 sealingly engages the hollow annular seal 150 on first solid surface of the hollow annular seal 150, and a base (e.g., base 116, sealing or contact surface) of the groove 210 of the second subsea component 104 sealingly engages the hollow annular seal 150 on a second solid surface of the hollow annular seal 150. In this example, the plurality of apertures 140 are arranged away from the contact surface of the first subsea component 102 and the base of the groove 210, as the plurality of apertures 140 are arranged axially upward and toward an inside flank 118 of the groove 210, at approximately 90 degrees, or perpendicular to the contact surface of the first subsea component 102. As shown in FIG. 12, a central axis 142 for each aperture of the plurality of apertures 140 may be disposed parallel to the central axis 132 (as shown in FIG. 10) and oriented upwards.

In operation, after the first subsea component 102 is installed onto the second subsea component 104, with the hollow annular seal 150 disposed within the groove 210, the plurality of apertures 140 will be in fluid communication with the upper annular gap 107 to allow fluid or pressure from the upper annular gap 107 to enter the hollow core 138 of the hollow annular seal 150. Specifically, when installed within the groove 210, the plurality of apertures 140 are positioned some distance from the base 116 of the groove 210 and similarly, positioned some distance from the inner cylindrical surface 106 of the first subsea component 102, in order to ensure that the plurality of apertures 140 do not interfere with a sealing function or performance of the hollow annular seal 150, while ensuring that the hollow core 138 of the hollow annular seal 130 is in fluid communication with the upper annular gap 107 via the plurality of apertures 140. Pressure from a fluid or pressure source may enter the hollow core 138 of the hollow annular seal 150 via one or more apertures of the plurality of apertures 140 to pressurize and further expand the hollow annular seal 150 against the base 116 of the groove 210 of the second subsea component 104 and the inner cylindrical surface 106 of the first subsea component 102 to thereby improve sealing performance of the hollow annular seal 150. The hollow annular seal 150 may similarly be used for a radial seal engagement for a rod seal configuration as shown for the subsea equipment assembly 300 of FIG. 3.

Referring to FIG. 12, an enlarged cross sectional view of the hollow annular seal 150 is illustrated, in accordance with various aspects of the subject technology. The interior of the cross section 136 of the hollow annular seal 150 is smaller than the exterior of the cross section 134, defining a relatively thick wall section. In one aspect, by providing a thick wall section, the hollow annular seal 150 is resilient and capable of generating a sufficient outward force (or expansion force) for sealing without requiring thousands of pounds-force to compress or deflect, as would be required with conventional solid annular seals. The circular shape defining the exterior of the cross section 134 of the hollow annular seal 150 may have an outside diameter 144, and the circular shape defining the interior of the cross section 136 may be have an inside diameter 146. In one aspect, to provide a sufficient outward or expansion force, a ratio of the outside diameter 144 to the inside diameter 146 may be approximately 2 to 1. The expansion force of the hollow annular seal 150 provides several beneficial functions for subsea application, including good sealing performance with large clearance gaps, and resistance to unintentional removal of the hollow annular seal 150 from a groove.

Each aperture of the plurality of apertures 140 may have a diameter 148. In one aspect, the diameter 148 may be large to allow free communication of fluid to the hollow core 138. For example, the diameter 148 may be about one-half or larger of the inside diameter 146 of the interior cross-section 136 or the hollow core 138. In this example, the hollow core 138 of the hollow annular seal 150 may freely communicate with the upper annular gap 107 (as shown in FIG. 2) via the plurality of apertures 140, to prevent collapse of the hollow annular seal 150 and to contain fluid. Alternatively, the hollow annular seal 150 may be installed to the groove 210 with the plurality of apertures 140 arranged axially downward and toward an inside flank 120 of the groove 210, such that the hollow core 138 of the hollow annular seal 150 may freely communicate with the lower annular gap 109 (as shown in FIG. 2) via the plurality of apertures 140, to prevent collapse of the hollow annular seal 150 and to contain fluid.

Figure 13:
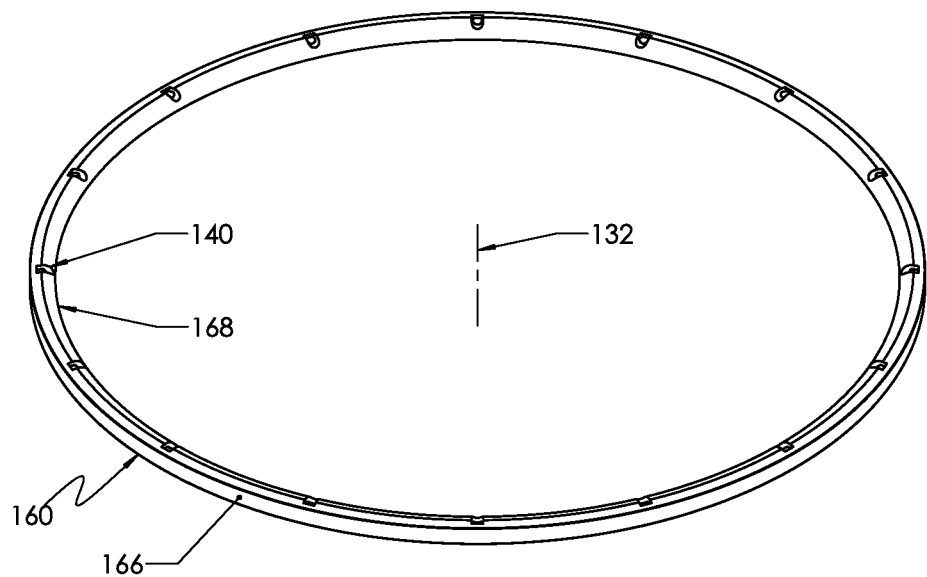
FIG. 13 illustrates an isometric view of an exemplary hollow annular seal, in accordance with various aspects of the subject technology.

FIG. 13 illustrates an isometric view of an exemplary hollow annular seal 160, in accordance with various aspects of the subject technology. The hollow annular seal 160 may be similar in some aspects to the hollow annular seal 130, 150 described above, therefore, like parts will be designated by like reference numerals and will not be further detailed below. The hollow annular seal 160 can comprise an elastomeric material that may, for example, include natural rubbers, synthetic rubbers, polyurethanes and similar elastomeric compounds as would be known by a person of ordinary skill. The hollow annular seal 160 defines a central axis 132 and further comprises a plurality of apertures 140.

Figure 14:
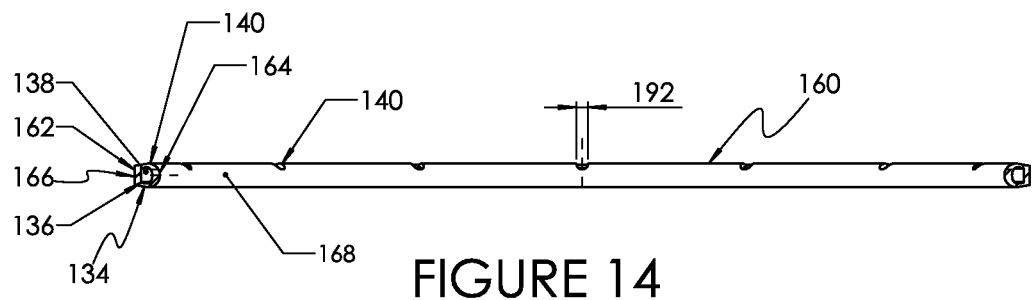
FIG. 14 illustrates a partial cross sectional view of an exemplary hollow annular seal, in accordance with various aspects of the subject technology.

Referring to FIG. 14, a cross sectional view of the hollow annular seal 160 is illustrated, in accordance with various aspects of the subject technology. The hollow annular seal 160 may comprise an exterior of the cross section 134, an interior of the cross section 136, and a hollow core 138. Each aperture of the plurality of apertures 140 penetrates through the cross section of the hollow annular seal 160 to fluidly couple the hollow core 138 to a fluid source or pressure source external of the hollow annular seal 160, and thereby allow the fluid to enter the hollow core 138 via one or more apertures of the plurality of apertures 140 to prevent collapse of the hollow annular seal 160 when disposed in a subsea environment.

In some aspects, the hollow annular seal 160 may be in fluid communication with an upstream pressure source that causes fluid provided by the upstream pressure source to flow through one or more apertures of the plurality of apertures 140 and within the hollow core 138 of the hollow annular seal 160, to thereby prevent the hollow annular seal 160 from collapsing and further, to maintain an adequate seal between concentrically arranged subsea components. In addition, the plurality of apertures 140 are arranged and oriented to avoid contact with sealing surfaces of the concentrically arranged subsea components (e.g., subsea components 102, 104) in order to ensure that the plurality of apertures 140 do not interfere with a sealing function or performance of the hollow annular seal 160.

Figure 15:
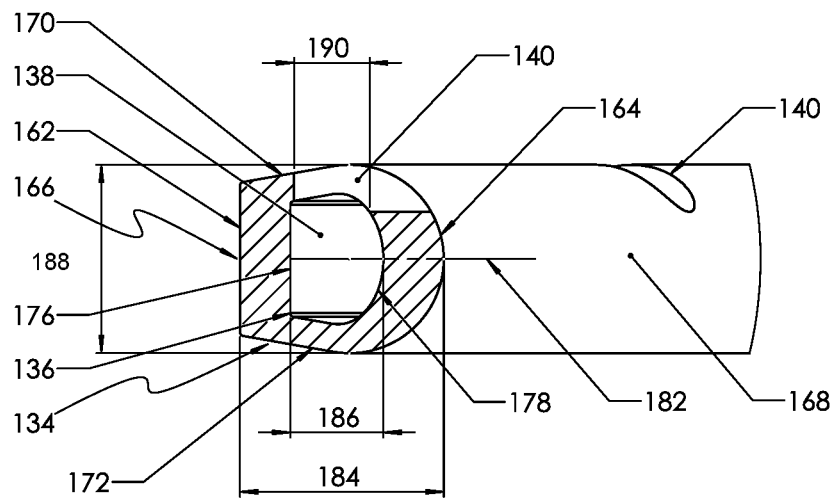
FIG. 15 illustrates an enlarged partial cross sectional view of the exemplary hollow annular seal of FIG. 14, in accordance with various aspects of the subject technology.

Referring to FIG. 15, an enlarged cross sectional view of the hollow annular seal 160 is illustrated, in accordance with various aspects of the subject technology. The hollow annular seal 160 comprises a modified "D" shape for the exterior of the cross section 134. The modified "D" shape of the exterior of the cross section 134 of the hollow annular seal 160 comprises a flat portion 162 and an inner portion 164 and is typically symmetric about a centerline 182 of the cross section 134. The flat portion 162 may define a first sealing surface 166 that is configured to contact a base of a groove, as discussed further below. The inner portion 164 may comprise a curve, partial circular shape, or partial elliptical shape, and defines a second sealing surface 168. The inner portion 164 may be connected to the flat portion 162 via a first exterior leg 170 and a second exterior leg 172. Alternatively, the inner portion 164 may be connected directly to the flat portion 162 with two small radii. The first exterior leg 170 and/or the second exterior leg 172 may be curved, may comprise a partial circular shape, a partial elliptical shape, straight, parallel with respect to one another, and/or may be angled or tapered with respect to one another.

The interior of the cross section 136 of the hollow annular seal 160 may have a modified "D" shape similar to the modified "D" of the exterior of the cross section 134, with an exterior flat portion 176 and an interior curved portion 178. In one aspect, the interior of the cross section 136 of the hollow annular seal 160 may have varying shapes, including a circular shape, without departing from the scope of this disclosure. In some aspects, the modified "D" shape of the exterior of the cross section 134 of the hollow annular seal 160 provides a low compression force while also providing a more resilient annular seal during installation and retrieval of subsea components (e.g., first subsea component 102), when compared to conventional annular seals.

Similar to the hollow annular seals 130, 150, each aperture of the plurality of apertures 140 for the hollow annular seal 160 may be large compared to the size of the interior of the cross section 136 to allow free communication of fluid to the hollow core 138. For example, a plurality of apertures 140 that may be defined by a minimum opening 190 in the radial direction and a minimum opening 192 in the circumferential direction, which may each be about one-half or larger of the interior cross-section 136 or the hollow core 138 that may be defined by an inside dimension 186. In this example, the hollow core 138 of the hollow annular seal 160 may freely communicate with the upper annular gap 107 (as shown in FIG. 3) via the plurality of apertures 140, to prevent collapse of the hollow annular seal 160 and to contain fluid. In one aspect, the apertures 140 may have varying shapes as required to facilitate manufacturing of the plurality of apertures 140.

The hollow annular seal 160 may be configured for use as a rod seal where the hollow annular seal 160 engages concentrically arranged subsea components in a radial direction, as shown for example in the subsea equipment assembly 300 illustrated in FIG. 3. Alternatively, the hollow annular seal 160 may be configured for use as a piston seal where the hollow annular seal 160 engages concentrically arranged subsea components in a radial direction, as shown for example in the subsea equipment assembly 200 illustrated in FIG. 2. In another alternative, the hollow annular seal 160 may be configured for use as a face seal where the hollow annular seal 160 engages concentrically arranged subsea components in an axial direction, as shown for example in the subsea equipment assembly 100 illustrated in FIG. 1. Referring to FIG. 3, when installed within a groove, such as the dovetail groove 310 of subsea equipment assembly 300, the flat portion 162 of the hollow annular seal 160 contacts the base 116 of the groove 310 to position the hollow annular seal 160 in a specific orientation with respect to the groove 310. When disposed within the groove 310, the flat portion 162 also maintains the orientation of plurality of apertures 140 so that the plurality of apertures 140 may be oriented upwards, downwards, or away from the sealing surfaces of the concentrically arranged subsea components. In one aspect, the plurality of apertures 140 may be oriented to face either toward the upper annular gap 107 or toward the lower annular gap 109, as desired. In another aspect, the modified "D" shape, and particularly the flat portion 162, of the hollow annular seal 160 prevents the hollow annular seal 160 from being easily displaced or rolled, thereby maintaining the desired orientation of the hollow annular seal 160 and the plurality of apertures 140 within the groove 310 during installation of the subsea components 102, 104.

When installed within the groove 310, the first sealing surface 166 sealingly engages the base 116 of the groove 310. The second sealing surface 168 will extend from the groove 310 in order to sealingly engage the outer circumferential surface 108 of the second subsea component 104.

In operation, as the first subsea component 102 with the hollow annular seal 160 disposed within the groove 310 is introduced into the ocean, the plurality of apertures 140 allow fluid (e.g., seawater) to enter the hollow core 138. After the first subsea component 102 is installed onto the second subsea component 104, the plurality of apertures 140 will be in fluid communication with the upper annular gap 107 to allow fluid or pressure from the upper annular gap 107 to enter the hollow core 138 of the hollow annular seal 160. Specifically, when installed within the groove 310, the plurality of apertures 140 are positioned some distance from the base 116 of the groove 310 and similarly, positioned some distance from the outer circumferential surface 108 of the second subsea component 104, in order to ensure that the plurality of apertures 140 do not interfere with a sealing function or performance of the hollow annular seal 160, while ensuring that the hollow core 138 of the hollow annular seal 130 is in fluid communication with the upper annular gap 107 via the plurality of apertures 140. Pressure from a fluid or pressure source may enter the hollow core 138 of the hollow annular seal 160 via one or more apertures of the plurality of apertures 140 to pressurize and further expand the hollow annular seal 160 against the base 116 of the groove 310 of the first subsea component 102 and the outer circumferential surface 108 of the second subsea component 104 to thereby improve sealing performance of the hollow annular seal 160.

Referring to FIG. 15, the interior of the cross section 136 of the hollow annular seal 160 is smaller than the exterior of the cross section 134, defining a relatively thick wall section. In one aspect, by providing a thick wall section, the hollow annular seal 160 is resilient and capable of generating a sufficient outward force (or expansion force) for sealing without requiring thousands of pounds-force to compress or deflect, as would be required with conventional solid annular seals. The exterior of the cross section 134 of the hollow annular seal 160 may be defined by an outside dimension 184 and an outside width 188, and the interior of the cross section 136 defined by the inside dimension 186. In one aspect, to provide a sufficient outward or expansion force, a ratio of the outside dimension 184 to the inside dimension 186 may be approximately 2 to 1. In another aspect, the outside width 188 of the hollow annular seal 160 may be larger than a width of the opening 122 (as shown in FIG. 3). When installed within the groove 310, the hollow annular seal 160 is disposed within the tapered or angled flanks 118, 120 and positively or mechanically engaged within the groove 110 (as shown in FIG. 3). The expansion force of the hollow annular seal 160 provides several beneficial functions for subsea application, including good sealing performance with large clearance gaps, lower installation force into a dovetail groove as compared to conventional solid annular seals, and resistance to unintentional removal of the hollow annular seal 160 from a groove.

Referring once again to the FIGS. the annular seal 130 in FIGS. 7-9 (and alternatively as 150 in FIGS. 10-12 and 160 in FIGS. 13-15) is configured for installation within a groove for sealing between two concentrically arranged components when disposed in a subsea environment. The annular seal comprises a tubular body having a cross sectional profile comprising a first boundary defining an exterior surface 134 of the tubular body and a second boundary defining an interior surface 136 of the tubular body. The exterior surface and the interior surface of the tubular body define a side wall of the annular seal therebetween. A hollow core space is bounded by the interior surface of the tubular body and is configured to receive fluid therein. There is a plurality of apertures 140, each extending through the side wall of the annular seal and through which fluid enters the hollow core space preventing collapse of the fluid filled hollow annular seal under subsea conditions.

To assure adequate fluid flow into the hollow core space, a maximum dimension 148 measured cross-wise of at least one of the plurality of apertures is at least as great as one-half the maximum dimension 146 measured cross-wise of the hollow core space of the annular seal. Alternatively, a majority (over fifty percent) of the plurality of apertures is at least as great as one-half the maximum dimension measured cross-wise of the hollow core space of the annular seal.

The annular seal consists at least partially of an elastomeric material, and alternatively consists predominantly (over fifty percent) of an elastomeric material or entirely (essentially one hundred percent) of an elastomeric material.

As depicted in FIGS. 7-12, the tubular body of the annular seal has a cross sectional shape that is substantially "O" shaped. Alternatively, and as depicted in FIGS. 13-15, the tubular body of the annular seal has a cross sectional shape that is substantially "D" shaped.

In an alternative, active subsea configuration disclosed herein, a subsea annular seal arrangement is established in which an annular seal is positioned in a groove recessed into one of two concentrically arranged subsea components. The annular seal sealingly engages each of the two concentrically arranged components thereby establishing a seal therebetween in the subsea configuration. The annular seal comprises a tubular body having a cross sectional profile having a first boundary defining an exterior surface of the tubular body and a second boundary defining an interior surface of the tubular body. The exterior surface and the interior surface of the tubular body define a side wall of the annular seal therebetween. A fluid filled hollow core space is bounded by the interior surface of the tubular body and is filled with seawater retained in the hollow core space. Each of a plurality of apertures extend through the side wall of the annular seal and seawater passes therethrough and fills the hollow core space thereby preventing collapse of the annular seal in subsea conditions.

The hollow annular seals 130, 150, 160 of the subject technology are not limited to the various cross-sections disclosed herein, as a person of ordinary skill in the art would appreciate that other shapes and profiles may be utilized for a hollow seal disposed in a subsea environment without departing from the scope of this disclosure. For example, a hollow annular seal with a plurality of apertures may have the cross sectional shape of a triangle, square, rectangle, polygon (e.g., pentagon, hexagon), or a combination thereof.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A hollow annular seal assembly comprising:
    a hollow annular seal for installation within a seal groove for sealing two concentric components disposable in a subsea environment; and
    a first of the two concentric components at least partially forming the seal groove oriented towards a sealing surface of a second of the two concentric components, wherein the seal groove includes a sealing surface at a flat bottom surface of the seal groove;
    the hollow annular seal comprises:
    a cross-sectional profile having a substantially "D" shaped exterior shape comprising a flat portion opposite a curved portion, wherein the exterior shape of the hollow annular seal defines an exterior surface of the hollow annular seal and further comprises an interior shape forming a hollow core configured to receive a fluid therein;
    a maximum cross-wise dimension of the interior shape of the hollow annular seal between one-fourth and three-fourths of a maximum cross-wise dimension of the substantially "D" shaped exterior shape, as measured from the flat portion to the curved portion;
    a plurality of apertures extending through a side wall of the hollow annular seal to allow fluid to flow into the hollow core;
    the plurality of apertures oriented to prevent contact between the apertures and the respective sealing surfaces of the two concentric components and to fluidically communicate with an external pressure source;
    the flat portion of the substantially "D" shaped exterior portion of the hollow annular seal engaged to the flat bottom surface of the seal groove of the first concentric component to maintain a predetermined orientation of the apertures;
    the hollow core of the hollow annular seal thereby configured to fluidically communicate with the external pressure source, so that the fluid disposed within the hollow core will prevent collapse of the hollow annular seal when disposed in the subsea environment;
    the plurality of apertures having a maximum cross-wise dimension being at least one-half of an inside dimension that defines a maximum size of the interior shape such that the fluid in the hollow core is operable to freely communicate with the external pressure source;
    the hollow annular seal being mechanically retained to the seal groove by one of: (i) the hollow annular seal installed to an outward facing seal groove, (ii) the hollow annular seal installed to an inward facing seal groove, and/or (iii) the hollow annular seal installed to an axially facing seal groove whereby a minimum opening width defining the seal groove being narrower than a maximum cross-wise exterior dimension of the hollow annular seal; and
    the exterior surface of the hollow annular seal operable to sealingly engage the first concentric component and the second concentric component.

2. The hollow annular seal assembly of claim 1, wherein the substantially "D" shaped exterior shape further comprises two sides opposite one another and extending between the flat portion and the curved portion of the hollow annular seal, wherein the two sides are one of (i) parallel to one another; (ii) angled with respect to one another, and/or (iii) oppositely arch-shaped with respect to one another.

3. The hollow annular seal assembly of claim 1, wherein the exterior shape further comprises radii at intersections between the flat portion and the curved portion.

4. The hollow annular seal assembly of claim 1, wherein the interior shape being substantially "D" shaped and further comprises two sides opposite one another and extending between a flat portion and a curved portion of the interior shape, wherein the two sides are one of (i) parallel to one another; (ii) angled with respect to one another, and/or (iii) oppositely arch-shaped with respect to one another.

5. The hollow annular seal assembly of claim 1, wherein the interior shape being substantially "D" shaped and further comprises radii at intersections between the flat portion and the curved portion of the interior shape.

6. The hollow annular seal assembly of claim 1, wherein the hollow annular seal being constructed of an elastomeric material.

7. The hollow annular seal assembly of claim 1, wherein a maximum cross-wise dimension of the interior shape being approximately one-half of a maximum cross-wise dimension of the substantially "D" shaped exterior shape, as measured from the flat portion to the curved portion.

8. The hollow annular seal assembly of claim 1, wherein the hollow core is configured to fluidically communicate with the external pressure source and when the fluid is disposed within the hollow core it acts to pressure energize the hollow annular seal.

9. A hollow annular seal assembly comprising:
    a hollow annular seal for installation within a seal groove for sealing two concentric components operable to be disposed in a subsea environment; and
    a first of the two concentric components at least partially forming the seal groove oriented towards a sealing surface of a second of the two concentric components, wherein the seal groove includes a sealing surface at a flat bottom surface of the seal groove;
    the hollow annular seal comprises:
    a tubular body of the hollow annular seal having a cross-sectional profile comprising an exterior shape defining an exterior surface of the tubular body and an interior shape defining an interior surface of the tubular body;
    the exterior surface and the interior surface of the tubular body defining a side wall of the annular seal therebetween;

a hollow core formed by the interior surface, wherein the hollow core being configured to receive a fluid therein;

a maximum cross-wise dimension of the interior shape of the tubular body between one-fourth and three-fourths of a maximum cross-wise dimension of the exterior shape operable to resist external collapse of the hollow annular seal, wherein the cross-wise dimensions are measured perpendicular to the sealing surface of the first concentric component;

a plurality of apertures, each extending through the side wall of the annular seal and through which fluid can enter the hollow core;

the plurality of apertures being orientated to prevent contact between the apertures and the respective sealing surfaces of the two concentric components and operable to fluidically communicate with an external pressure source;

the hollow core of the hollow annular seal thereby configured to fluidically communicate with the external pressure source, so that the fluid disposed within the hollow core will prevent collapse of the hollow annular seal when disposed in the subsea environment;

a maximum cross-wise dimension of the plurality of apertures being at least one-half of an inside dimension that defines a maximum size of the interior shape such that the fluid in the hollow core is operable to freely communicate with the external pressure source;

the hollow annular seal being mechanically retained to the seal groove by one of: (i) the hollow annular seal installed to an outward facing seal groove, (2) the hollow annular seal installed to an inward facing seal groove, and/or (3) the hollow annular seal installed to an axially facing seal groove whereby a minimum opening width defining the seal groove being narrower than a maximum cross-wise exterior dimension of the hollow annular seal; and wherein the exterior surface of the tubular body configured to sealingly engage the first concentric component and the second concentric component.

10. The hollow annular seal assembly of claim 9, wherein a maximum cross-wise dimension of the interior shape of the tubular body being approximately one-half of a maximum cross-wise dimension of the exterior shape of the tubular body.

11. The hollow annular seal assembly of claim 9 comprising an elastomeric material.

12. The hollow annular seal assembly of claim 9, wherein the exterior surface of the tubular body has a cross-sectional shape being substantially "D" shaped, with an exterior shape comprising a flat portion opposite a curved portion, with the flat portion operable to engage the flat bottom surface of the seal groove to maintain a predetermined orientation of the apertures.

13. The hollow annular seal assembly of claim 9, wherein the exterior surface of the tubular body has a cross sectional shape that is substantially circular shaped.

14. The hollow annular seal assembly of claim 1, wherein the hollow core is configured to fluidically communicate with the external pressure source and when the fluid is disposed within the hollow core it acts to pressure energize the hollow annular seal.

15. A hollow annular seal assembly comprising:
a hollow annular seal for installation within a seal groove for sealing two concentric components disposable in a subsea environment; and
a first of the two concentric components at least partially forming the seal groove oriented towards a sealing surface of a second of the two concentric components, wherein the seal groove includes a sealing surface at a flat bottom surface of the seal groove;

the hollow annular seal comprises:
a cross-sectional profile of the hollow annular seal having an exterior surface defined by an exterior shape of the hollow annular seal and an interior surface defined by an interior shape of the hollow annular seal;

the exterior surface and the interior surface of the hollow annular seal defining a side wall of the annular seal therebetween;

a hollow core formed by the interior surface, wherein the hollow core being configured to receive a fluid therein;

a maximum cross-wise dimension of the interior shape being between one-fourth and three-fourths of a maximum cross-wise dimension of the exterior shape to resist external collapse of the hollow annular seal, with the maximum cross-wise dimensions measured perpendicular to the sealing surface of the first concentric component;

a plurality of apertures, each extending through the side wall of the hollow annular seal and through which fluid can enter the hollow core;

the plurality of apertures oriented to prevent contact between the apertures and the respective sealing surfaces of the two concentric components and to fluidically communicate with an external pressure source;

the hollow core of the annular seal thereby configured to fluidically communicate with the external pressure source so that the fluid disposed within the hollow core will prevent collapse of the hollow annular seal when disposed in the subsea environment;

a maximum cross-wise dimension of the plurality of apertures being at least one-half of an inside dimension that defines a maximum size of the interior shape such that the fluid in the hollow core is operable to freely communicate with the external pressure source;

the hollow annular seal being mechanically retained to the seal groove by one of: (i) the hollow annular seal installed to an outward facing seal groove, (2) the hollow annular seal installed to an inward facing seal groove, and/or (3) the hollow annular seal installed to an axially facing seal groove whereby a minimum opening width defining the seal groove being narrower than a maximum cross-wise exterior dimension of the hollow annular seal;

the hollow annular seal constructed of an elastomeric material; and wherein the exterior surface of the hollow annular seal being configured to sealingly engage the first concentric component and the second concentric component.

16. The hollow annular seal assembly of claim 15, wherein a maximum cross-wise dimension of the interior shape being approximately one-half of a maximum cross-wise dimension of the exterior shape.

17. The hollow annular seal assembly of claim 15, wherein the exterior shape being substantially "D" shaped with a flat portion opposite a curved portion, whereby the flat portion operably engages the flat bottom surface of the seal groove to maintain a predetermined orientation of the apertures.

18. The hollow annular seal assembly of claim 15, wherein the exterior surface has a cross sectional shape that is substantially circular shaped.

19. The hollow annular seal assembly of claim 1, wherein the hollow core is configured to fluidically communicate with the external pressure source and when the fluid is disposed within the hollow core it acts to pressure energize the hollow annular seal.

20. An elastomeric sealing system with a hollow annular seal installed to a seal groove for sealing two concentric components operable to be disposed in a subsea environment, comprising:
a first of the two concentric components at least partially forming a seal groove oriented towards a sealing surface of a second of the two concentric components, wherein the seal groove includes a sealing surface defined by a flat bottom surface;
a cross-sectional profile having a substantially "D" shaped exterior shape defined by a flat portion opposite a curved portion, wherein the hollow annular seal further comprises an interior shape with a hollow core for receiving a fluid therein, whereby a maximum cross-wise dimension of the interior shape being between one-fourth and three-fourths of a maximum cross-wise dimension of the exterior shape to resist external collapse of the hollow annular seal, with the cross-wise dimensions measured from the flat portion to the curved portion;
a plurality of apertures extending through a side wall of the hollow annular seal operable to allow fluid to flow into the hollow core;
the plurality of apertures oriented to prevent contact between the apertures and the respective sealing surfaces of the two concentric components and operable to fluidically communicate with an external pressure source;
the flat portion of the substantially "D" shaped exterior shape being operable to engage the flat bottom surface of the seal groove to maintain a predetermined orientation of the apertures;
the hollow core of the hollow annular seal thereby configured to fluidically communicate with the external pressure source so that the fluid disposed within the hollow core will prevent collapse of the hollow annular seal when disposed in the subsea environment while further acting to pressure energize the hollow annular seal;
a maximum cross-wise dimension of the plurality of apertures being at least one-half of an inside dimension that defines a maximum size of the interior shape such that the fluid in the hollow core is operable to freely communicate with the external pressure source;
the hollow annular seal being mechanically retained to the seal groove by one of: (1) the hollow annular seal installed to an outward facing seal groove, (2) the hollow annular seal installed to an inward facing seal groove, and/or (3) the hollow annular seal installed to an axially facing seal groove whereby a minimum opening width defining the seal groove being narrower than a maximum cross-wise exterior dimension of the hollow annular seal; and
an exterior surface of the hollow annular seal defined by the exterior shape configured to sealingly engage the first concentric component and the second concentric component.

21. The elastomeric sealing system of claim 20, wherein the maximum cross-wise dimension of the interior shape being approximately one-half of the maximum cross-wise dimension of the substantially "D" shaped exterior shape.

22. A hollow annular seal assembly comprising:
a hollow annual seal installed within a seal groove for sealing two concentric components operable to be disposed in a subsea environment; and
a first of the two concentric components at least partially forming a seal groove oriented towards a sealing surface of a second of the two concentric components, wherein the seal groove includes a sealing surface defined by a flat bottom surface;
the hollow annular seal comprises:
a cross-sectional profile having a substantially "D" shaped exterior shape comprising a flat portion opposite a curved portion, wherein the hollow annular seal further comprises an interior shape comprising a hollow core for receiving a fluid therein, whereby a maximum cross-wise dimension of the interior shape being between one-fourth and three-fourths of a maximum cross-wise dimension of the exterior shape to resist external collapse of the hollow annular seal, with the cross-wise dimensions measured from the flat portion to the curved portion;
a plurality of apertures, each extending through the side wall of the annular seal and through which fluid can enter the hollow core;
the plurality of apertures oriented to prevent contact between the apertures and the respective sealing surfaces of the two concentric components and operable to fluidically communicate with an external pressure source;
the flat portion of the substantially "D" shaped exterior portion being operable to engage the flat bottom surface of the seal groove of the first concentric component to maintain a predetermined orientation of the apertures;
the hollow core of the hollow annular seal thereby configured to fluidically communicate with the external pressure source so that the fluid disposed within the hollow core will prevent collapse of the hollow annular seal when disposed in the subsea environment while further acting to pressure energize the hollow annular seal;
a maximum cross-wise dimension of the plurality of apertures being at least one-half of an inside dimension that defines a maximum size of the interior shape such that the fluid in the hollow core being operable to freely communicate with the external pressure source;
the hollow annular seal being mechanically retained to the seal groove by one of: (1) the hollow annular seal installed to an outward facing seal groove, (2) the hollow annular seal installed to an inward facing seal groove, and/or (3) the hollow annular seal installed to an axially facing seal groove whereby a minimum opening width defining the seal groove being narrower than a maximum cross-wise exterior dimension of the hollow annular seal;
the hollow annular seal constructed of an elastomeric material; and
the exterior surface of the hollow annular seal configured to sealingly engage the first concentric component and the second concentric component.

23. The hollow annular seal assembly of claim 22, wherein the maximum cross-wise dimension of the interior shape being approximately one-half of the maximum cross-wise dimension of the substantially "D" shaped exterior shape.

* * * * *